Figure 1:
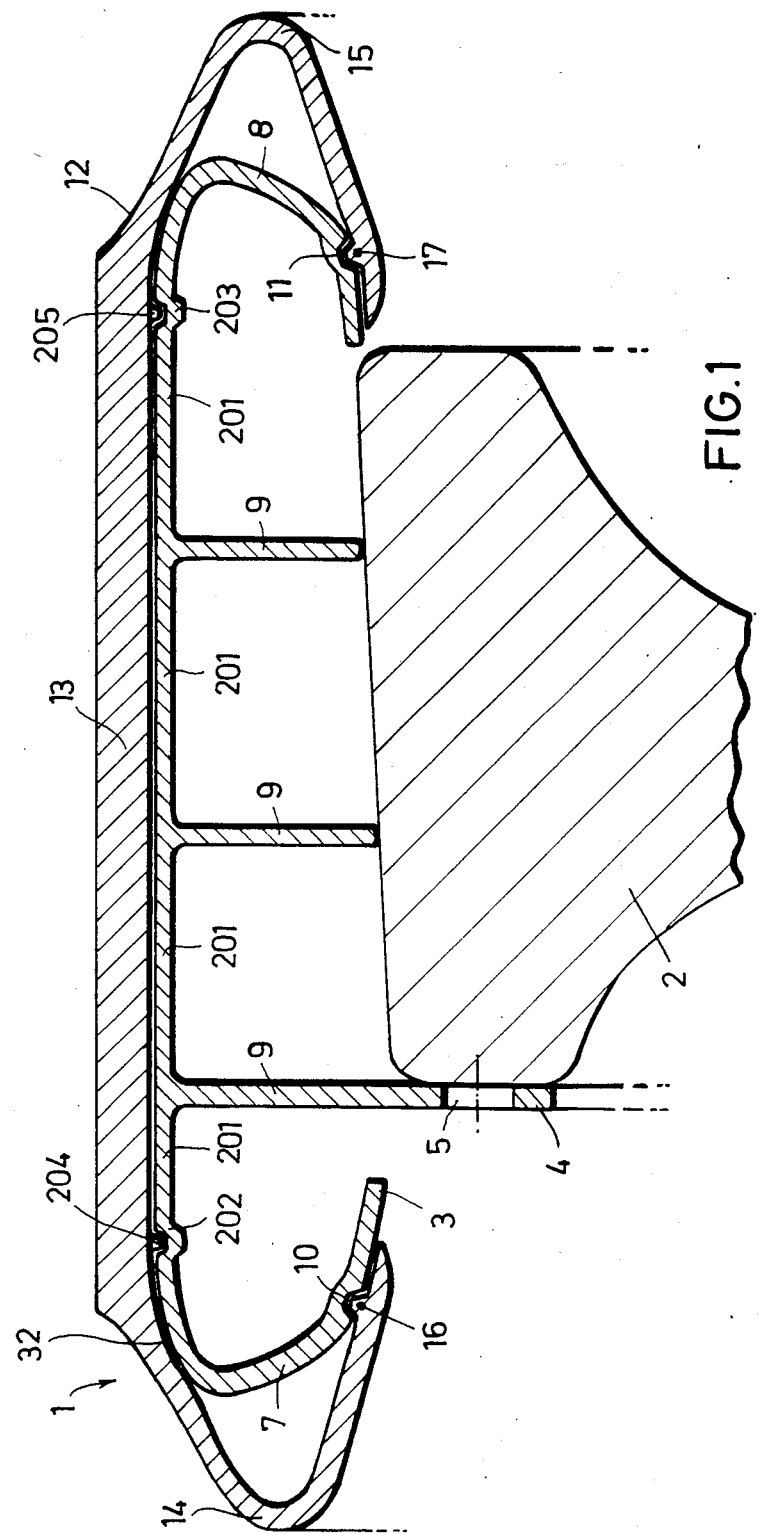

United States Patent [19]

Janus

[11] Patent Number: 4,662,418
[45] Date of Patent: May 5, 1987

[54] VEHICLE WHEEL RIM FOR ENGAGING TIRE BEAD ON RADIAL INWARD SURFACE

[76] Inventor: Jonny Janus, Kreuzstrasse 53, D-4000 Düsseldorf, Fed. Rep. of Germany

[21] Appl. No.: 690,721

[22] Filed: Jan. 11, 1985

[30] Foreign Application Priority Data

Jan. 11, 1984 [DE] Fed. Rep. of Germany ....... 3400649

[51] Int. Cl.$^4$ ............................................. B60B 21/04
[52] U.S. Cl. ............................ 152/380; 152/DIG. 20; 152/387
[58] Field of Search ........ 152/380, 387, 397, DIG. 20

[56] References Cited

U.S. PATENT DOCUMENTS

| | | | |
|---|---|---|---|
| 471,813 | 3/1892 | DeWolfe | 152/397 X |
| 509,164 | 11/1893 | Holt | 152/397 X |
| 647,077 | 4/1900 | Cottrell | 152/397 X |
| 4,168,732 | 9/1979 | Monzini | 152/398 X |
| 4,563,042 | 1/1986 | Seitz et al. | 152/380 X |

*Primary Examiner*—David A. Scherbel
*Attorney, Agent, or Firm*—Merchant, Gould, Smith, Edell Welter & Schmidt

[57] ABSTRACT

A vehicle wheel has a wheel body or hub, an annular rigid rim mounted on it and an elastic inflatable tire mounted on the rim, the beads of the tire engaging annular recesses present on the inner face of the rim. The rim is provided with side flanks of the same curvature matched to the curvature which the flanks of the tire take up in operation, and between which is provided an annular engaging surface extending over the whole width of the rim from flank to flank, this surface giving the wheel good emergency characteristics. The inserts in the beads of the tire do not need any thickened beads which would adversely affect the resilience of its side walls, but only need to be made constructionally and to hold the reinforcing cords. The rim is made in one piece of a light material such as plastics or aluminum and can form an air reservoir for compressed air which is under high pressure and which automatically replenishes the tire when needed.

10 Claims, 5 Drawing Figures

VEHICLE WHEEL RIM FOR ENGAGING TIRE BEAD ON RADIAL INWARD SURFACE

The invention relates to a vehicle wheel comprising a wheel body forming the hub, a rigid annular rim mounted on the body and an inflatable tire of elastic material mounted on the rim and having beads which engage annular recesses present on the inner face of the rim.

A vehicle wheel of this kind is known from DE-OS No. 32 04 676. As the rim is mounted detachably on the body of the wheel it can be exchanged complete with the tire. The sidewalls of the elastic tire exhibit a good spring action as no strong beads are required for securing the tire on the rim. Accordingly the tire can be made of lower profile, i.e. flatter. In this known vehicle wheel, however, there are no special provisions for achieving a lateral stability of the tire, which is particularly important when negotiating curves. Also this previously known vehicle wheel has no emergency running characteristics, which are becoming increasingly demanded today.

A vehicle wheel having emergency running characteristics to allow for the situation that the air pressure escapes from the tire is known from DE-OS No. 30 19 742. In this wheel the rim has an annular outer body present in the interior of the tire and having a raised central portion on which the running surface of the tire is supported in emergencies, that is to say in the event of the air escaping from the tire. This emergency supporting surface is, however, relatively small. To obtain the lateral stability for the side walls of the tire, thickened and stiff beads are provided, projecting far into the walls of the tire, so that they have an adverse effect on its spring characteristics, increasing the cross sectional surface area of the walls of the tire and thereby generating additional weight and cost.

The invention is based on solving the problem of improving the known vehicle wheel of DE-OS 32 04 676 in such a way that the tire can be mounted on the rim without problems and also removed from it, improved lateral stability without adverse effects on the spring characteristic and thereby maintaining the ride comfort, and the wheel should have good emergency running characteristics.

This problem is solved according to the invention in a vehicle wheel of the kind stated in the introduction above, in that the rim has bulged flanks which are matched to the degree of bulging which the tires adopt on normal loading on the tire, these flanks extending over a part of the height of the walls of the tire and supporting them, whilst between these flanks there is provided on the outside of the rim a continuous annular supporting surface on which the running surface of the tire can be supported under emergency conditions when the air pressure has escaped from the tire.

Thus according to the invention the rim is of such a form that it supports the side flanks of the tire over a part of its height against inwardly directed transverse accelerating forces and gives the tire forcibly in its inner region the shape which its side walls take up under normal load. Accordingly the tire can be made of thinner wall section than usual in the region of its side walls, so that overall it is a softer spring and in particular when negotiating curves the lateral support results in it taking up a minimum angle of inclination. That side wall of the tire which is on the outside of the curve is supported by the associated bulged flank of the rim right up to its upper edge, which can be inwardly rounded, and accordingly it is guided laterally, whilst the opposite side wall of the tire lifts away from the associated flank of the rim. By the annular supporting surface which extends over the whole width of the outside surface of the rim, the emergency running characteristics of the wheel are significantly improved.

Preferably the rim has a peripheral surface or engaging or supporting surface corresponding to the shape of the inner profile of the tire in a flat condition, so that in emergency situations the tire does not undergo any destructive deformation in the region in contact with the rim and furthermore it is guided exactly from the lateral point of view.

According to a further feature of the invention the rim can have wedge-shaped recesses such as circumferentially extending grooves, on its outer face in which can engage projections, such as knobs, present on the inner face of the tire. In this way the tire is centered with respect to the rim in an emergency, i.e., because of the knobs engaging in the grooves, it cannot be displaced laterally so that one can drive safely at high speeds even with the tire in a flat condition.

If the tire goes flat for example while travelling along a curved path, the knobs on the tire engage in the wedge-shaped recesses in the rim at the latest when the wheel returns to a straight path.

According to a practical embodiment of the invention the rim is formed in cross-section as a profiled body with bulged flanks and an annular engaging surface for the tire in a flat condition, extending over the whole width of the rim from flank to flank, and this profiled body can be open to the inside or the outside. In the first case an annular covering is provided on the outside to form the emergency running surface, whilst in the second case the connecting portion between the equally bulged lateral flanks of the rim forms the engaging surface for the flat tire.

The tire is easily mounted on the circumferentially extending annular recesses arranged on the inner face of the annular rim, as the bead inserts if the tire need only a limited ability to be compressed and expanded and do not need to be closed rings, but could comprise a short mutually abutting or indeed slightly overlapping pieces of wire or the like, because the rim can take all the tension forces which arise on the bead ring, since the diameter of the bead pressed into the annular recess is greater than the outer periphery of the annular recesses themselves. The cores of the beads, which are under compression loading accordingly press themselves into the recesses provided for them on the rim. In emergency situations there is no fear that the tire could be detached from the relatively rigid rim even though its beads have only a relatively small cross-section and do not require any thickened portions extending into the side walls of the tire.

According to a preferred practical embodiment of the invention the annular rim is made in one piece with its bulged side flanks and the ribs between them, from castable or injectable material, for example injection moulded or die-cast from plastics or aluminium. In this way the manufacture in an exact shape or with an accurate die is possible, so that the rim can be produced extremely true to shape. Accordingly one obtains a light, economical and uniform, (i.e. free from imbalance) rim, which is also extremely stiff against twisting, especially if the annular or sleeve-shaped surface provided for the emergency characteristics of the wheel is permanently secured to the bulged flanks and ribs of the rim. When wear of the tire mounted on the rim takes place the rim and tire are removed from the body or hub of the wheel and exchanged for a new rim fitted with a tire. The rim that has been taken off can be used again. At least the material of it can be recovered, for example by comminuting the rim, made of plastics, to a granulate, to form a starting material for an extrusion press or by melting down the rim where it is made of aluminium.

The surface provided to give the emergency characteristics can be a flexible ring or a flexible sleeve and is made for example of plastics or thin sheet metal.

According to a further feature of the invention the rim together with the layer secured on it forms an airtight container which can serve as a compressed air reservoir for the tire and is provided with inlet and outlet valves for the compressed air. The valves could be formed to be at least partially of adjustable pressure, so that when the air pressure in the tire falls below a predetermined value air flows into the tire, whilst when the air pressure in the tire exceeds a predetermined value air can escape from, and accordingly the pressure is relieved. In this way a uniform pressure can be maintained within the tire, i.e. the air pressure in the tire does not vary with variations in temperature but is always automatically compensated. Accordingly the same correct air pressure always prevails in the tire in cold and also warm times of year and when stationary or after a long journey.

According to a further feature of the invention the bulged flanks of the rim and accordingly also their ribs are of a height which corresponds to about a third up to about two-thirds of the height of the side walls of the tire. Preferably the bulged flanks are about half the height of the side walls of the tire, so that these side walls are supported laterally by the rim up to about half their height.

Figures 2, 5:
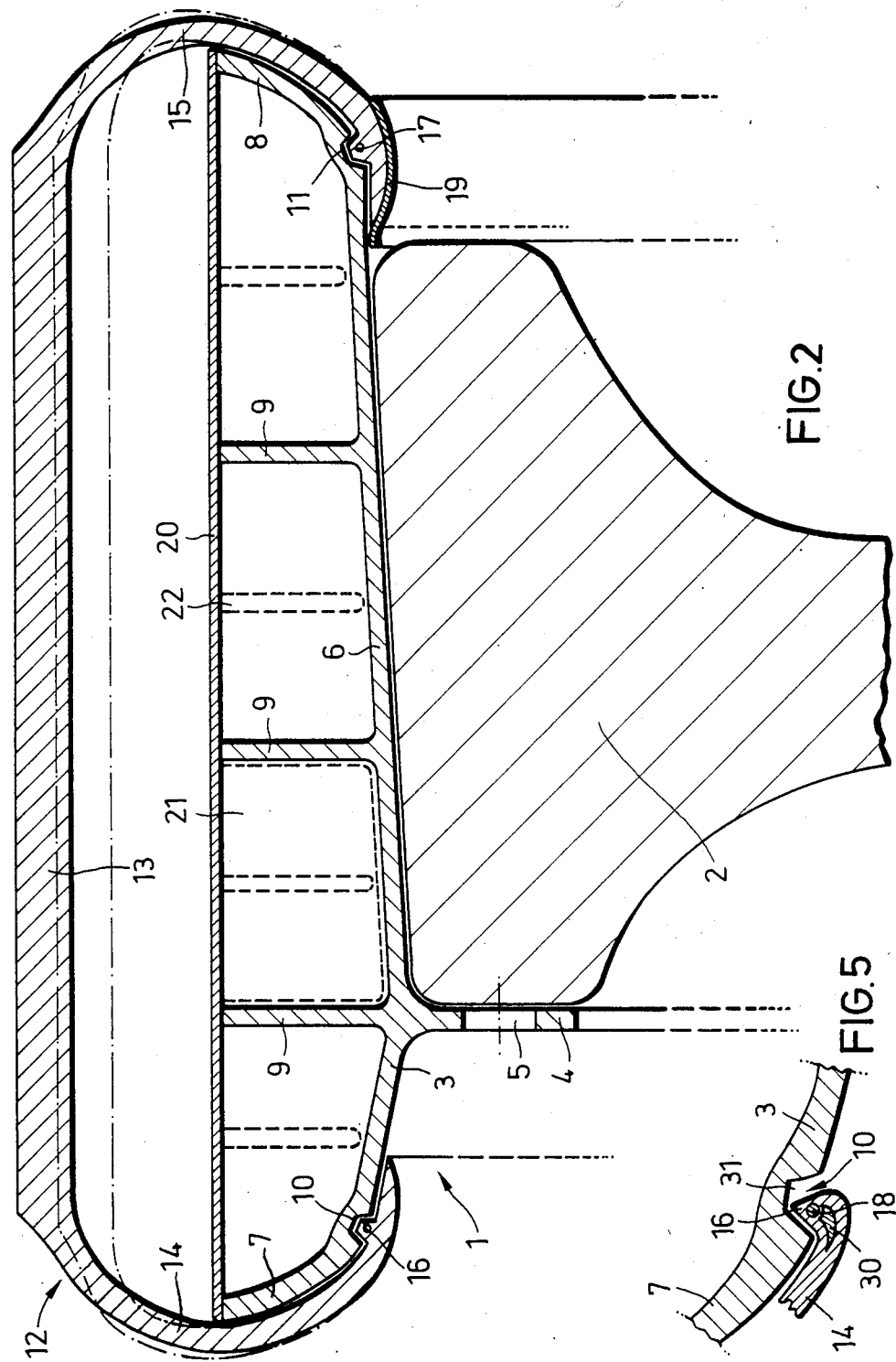
Figure 3:
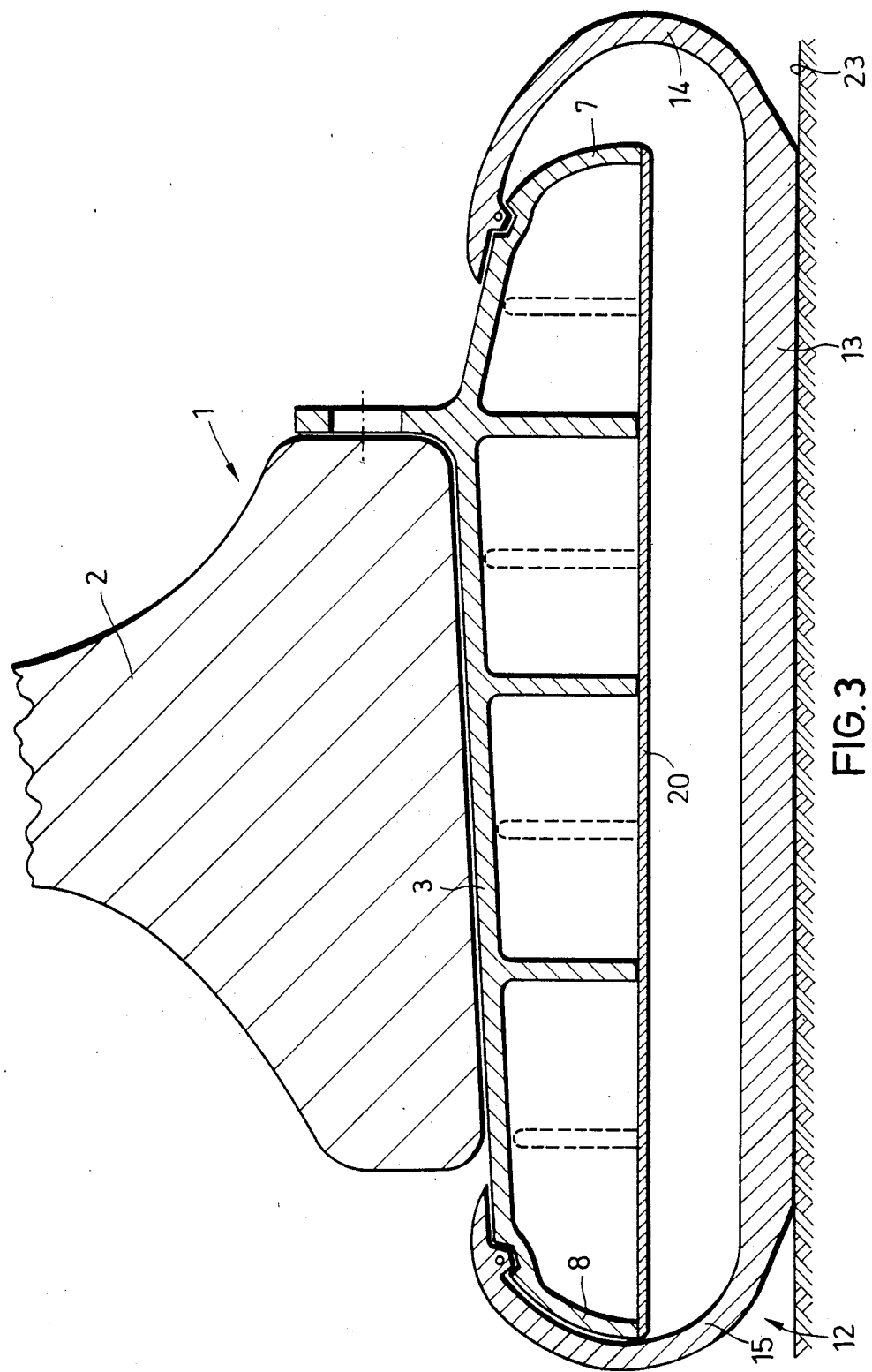
Figure 4:
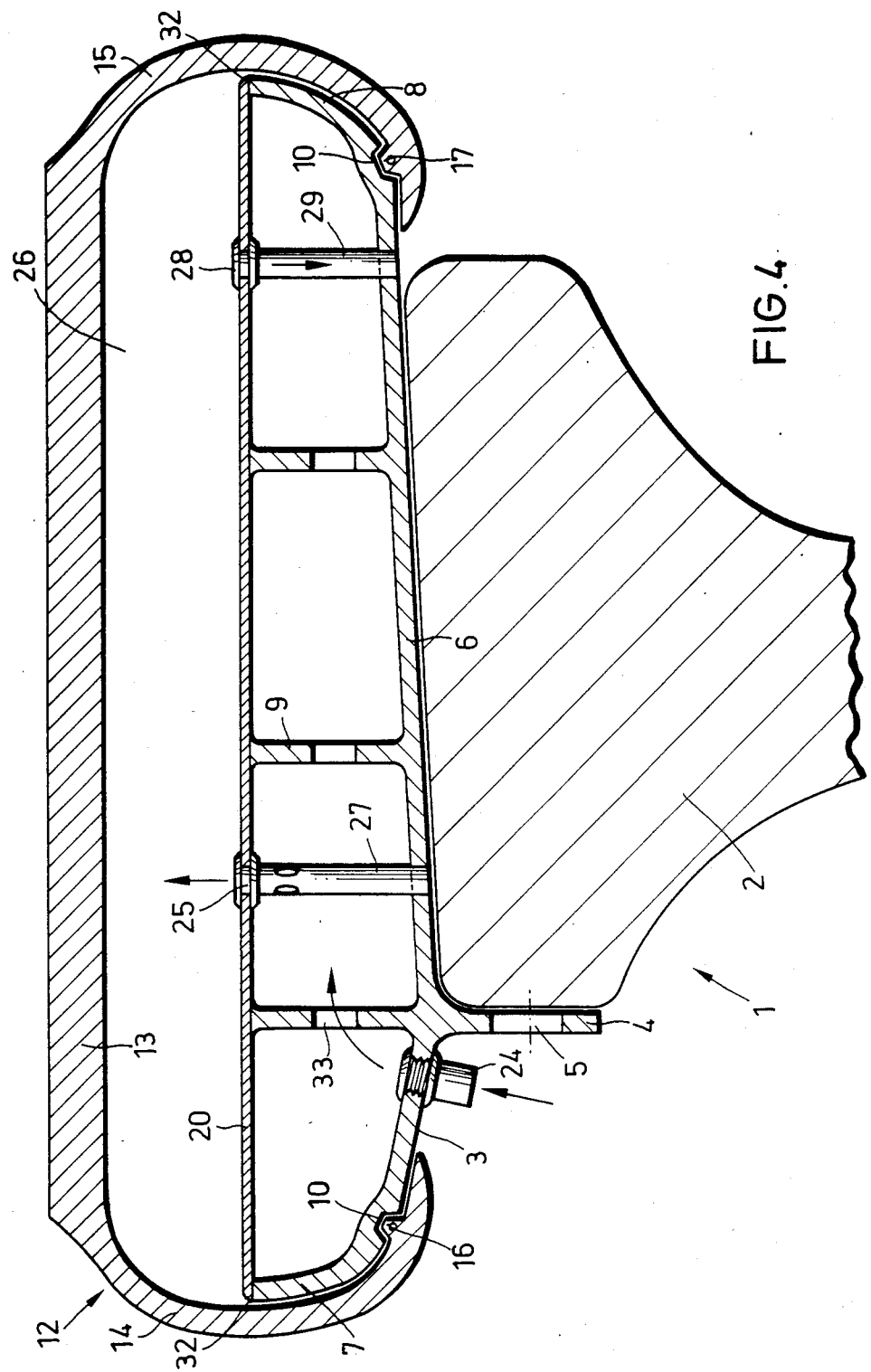

Some embodiments of the vehicle wheel according to the invention by way of example are illustrated in the drawing, in which:

FIG. 1 is a vertical section through the vehicle wheel with a detachable annular rim mounted on it and with a tire retained on the rim, the tire being illustrated in the flat condition, i.e. under emergency running conditions, FIG. 2 is a section similar to FIG. 1 of an embodiment with the tire inflated, in unloaded condition, shown in full lines, and illustrated in broken lines under normal loading, FIG. 3 is a section similar to FIG. 2 in which the attitude of the tire when travelling in a curved path is revealed, FIG. 4 is a section similar to FIG. 1 or a further modified embodiment of the annular rim and FIG. 5 is a partial section to a larger scale showing the position of one of the two beads on the tire in the annular recess provided for it in the rim.

The vehicle wheel 1 has a wheel body or hub 2 which is for example in the form of a star or a disc and has at its outer periphery an annular rim 3 which is detachably secured to it. For this purpose the rim 3 is provided with an inwardly directed annular flange 4 provided with holes 5 through which attachment elements, not shown, such as screws, can be inserted, by means of which the rim 3 is detachably secured to the body 2.

As shown in FIG. 1 the rim 3 is in the form of a profile section which is open towards the inside, having bulged side flanks 7 and 8 and a continuous outer surface 201. Inside the profiled section are perpendicularly extending ribs 9 serving as stiffening elements.

Mounted on this rim 3 is a tire 12 of elastic material which has beads 16 and 17 at the ends of its side walls 14 and 15, engaging in circumferentially extending grooves 10 and 11 provided on the inner face of the rim 3. The flanks 7 and 8 of the rim 3 have the same bulging curvature, but are of mirror-image relationship and merge smoothly into the outer surface 201 of the rim 3. Provided in this outer surface are annular grooves 202 and 203 of wedge-shaped cross-section, into which can project knobs 204 and 205 provided on the inner face of the running surface 13 of the tire 12 under the emergency running conditions illustrated in FIG. 1. The rim shown in FIG. 1 can be injection-moulded or die-cast in one piece from plastics or metal such as light alloy. The flanks 7 and 8 can be coated on their outer faces with a low-friction material, for example a layer, not shown, of Teflon, silicone or the like in order to keep as low as possible the friction between the side walls 14 and 15 of the tire 12 and the rim 3. Also the inwardly open rim 3 can be closed by a ring, not illustrated here, in order to prevent the entry of dirt and moisture and/or the interior of the rim could find other uses, for example as an air reservoir, in the manner further explained below in connection with FIG. 4.

The annular rim 3 shown in FIG. 2 has a shell-like cross-section with a substantially axially extending base portion 6 and curved upstanding lateral flanks 7 and 8. Between the flanks 7 and 8 there are ribs 9 extending in the circumferential direction of the rim 3, the height of the ribs corresponding to about that of the flanks 7 and 8.

On the inner face of the rim 3 there are provided inwardly open grooves 10 and 11 at about the transition point between the base portion 6 and the upstanding flanks 7 and 8, these grooves serving to receive the beads of a tire 12 detachably mounted on the rim 3. The tyre 12, made of elastic material, has a reinforced running surface or tread 13 and relatively thin-section side walls 14 and 15 which, in the examples illustrated, engage over about half their height against the upstanding flanks 7 and 8 of the rim 3 when the tire 12 is inflated and under its normal loading. Near the ends of the side walls 14 and 15 there are provided beads 16 and 17 of relatively small cross-section, lying in the grooves 10 and 11 when the tire 12 is mounted on the rim 3 and inflated. The beads each contain inserts 18 in the form of wire or pieces of wire or the like, which give the bead sufficient strength and act as an anchorage for the loops of cord reinforcement in the carcass and achieve the result that the bead is not pulled out of the associated groove 10 or 11 under the influence of its mounting requirements, or of the air pressure in the tire 12 or other loads on the tire. It will be noted that the annular beads 16 and 17 do not result in any increasing thickness of the tire which would have an adverse effect on the wall thickness of the side walls 14 and 15.

As shown on the right hand side of FIG. 1, each side wall 14 and 15 can be covered by a ring-shaped protective strip 19 in the region of the bead 16 or 17, serving to stabilize the connection between the tire 12 and the rim 3 and also to provide protection against thermal and mechanical loads on the tire 12, such as could result for example from heat input from the brakes which are present close by.

In FIG. 2 the tire 12 is shown in full lines in its inflated but otherwise unloaded condition, whilst in broken lines there is indicated the shape which the tire 12 takes up when it is under normal loading, i.e. it is slightly flattened. It will be noted that the side walls 14 and 15 in the region which is not supported by the flanks 7 and 8 of the rim 3 bulge out laterally and accordingly exhibit the spring action which is desirable for good ride comfort by the spring action over the entire height of the flanks, whilst they are supported in the region of the rim 3 by its bulged flanks 7 and 8, so that the tire 12 has the necessary lateral stability.

Against the peripheral surface of the rim 3 lies an annular or cylindrical or sleeve-shaped covering 20 which can be made of material which is anything from flexible up to more-or-less elastic, such as for example plastics or sheet metal, and closes off the outside of the rim 3. The covering 20 is permanently secured to the curved flanks 7 and 8 and the ribs 9 of the rim 3 and can be provided between the flanks 7 and 8 and the ribs 9 with transverse ribs 21 and, if necessary, longitudinal ribs 22, which support the covering with respect to the base portion 6 of the rim 3 and can be connected to the base portion 6 and to the ribs 9. As a result of this three-dimensional stiffening the rim 3 has an extremely high resistance to deformation but on the other hand, on a account of the small wall thickness which is possible, it is not heavy.

FIG. 3 illustrates how the tire 12 behaves when travelling along a curved path. The reinforced running surface or tread 13 of the tire 12 engages the road surface 23 and is deformed in such a way that the side wall 15 which is on the outside of the curve abuts against the flank 8 of the rim 3, whilst the side wall 14 lifts away from the opposing flank 7 of the rim 3. The tire 12 is thereby given the necessary lateral stability whilst at the same time maintaining the desired radial resilience for good ride comfort.

The upstanding flanks 7 and 8 are made of the same curvature and, to reduce the friction with respect to the side walls 14 and 15 of the tire 12, they can be coated with a low-friction medium such as Teflon, silicone or the like. The flanks 7 and 8 effect a forcible shaping of the side walls 14 and 15 of the inflated tire 12 into the shape which the side walls take up in the normal flattened or loaded tire. In this way we obtain a high degree of stiffness of the walls against transverse forces whilst maintaining the resilience of the tire in a perpendicular direction. The surfaces of the flanks 7 and 8 can be provided with an array of grooves in order to be certain of preventing any trapping of air in the region of the flanks.

In the embodiment shown in FIG. 4 the rim 3 is connected to the covering 20 to form an airtight container which forms a reservoir for compressed air making it possible to maintain a uniform air pressure in the tire 12 all the time. For example air can be stored at a pressure of 10 bar in the reservoir formed by the rim, whilst the desired tire pressure amounts to, for example, 1.8 bar. Openings 33 are present in the ribs 9 to connect the individual chambers of the air reservoir together.

For this purpose the rim 3 is provided with an inlet valve 24 capable of being connected to a source of compressed air and with an adjustable-pressure outlet valve 25 which leads into the interior 26 of the tire and which can be adjusted from outside through a tube 27 projecting through the base portion 6 of the rim 3. In addition an adjustable pressure venting valve 28 is provided, leading to atmosphere by a pipe 29 through the base portion 6 of the rim 3.

The outlet valve 25 can be set so that it opens as soon as the pressure in the interior 26 of the tire 12 falls below 1.8 bar, so that compressed air can flow from the reservoir. In the event of the pressure in the interior rising above 1.8 bar the valve 25 is closed and the venting valve 28 is opened, so that a damaging excess pressure cannot build up in the interior 26. The threshold value for opening and closing of the valves 25 and 28 could lie somewhat below and above 1.8 bar respectively so that the two valves are not always opening and closing.

FIG. 4 shows how the wire inserts 18 in the annular beads 16 and 17 can be provided with roughly wedge-shaped core slides 30 which achieve good transition of the cord filaments, not shown in the drawings. The annular beads 16 and 17 in this embodiment have a cross-section in the form of wedge-shaped sharp lips, which simplifies assembly on account of their compressibility. After assembly the free space 31 in the grooves 10 and 11 can have a sealing material injected into it and can be covered over by a protective strip 19. As shown in FIGS. 1 and 4, the transition 32 between the bulged flanks 7 and 8 and the covering 20 or 21 upon them is rounded off in order to prevent kinking of the side walls 14 and 15 of the tire 12 over the outer edges of the rim 3.

I claim:

1. A vehicle wheel having a hub, an annular rigid rim mounted on said hub, said rim having an inner face in which annular recesses are provided, and a radial outer face, and an inflatable tire of elastic material mounted on said rim and having an inner face, and an outer face, and spaced side walls, the side walls having a supported portion and an unsupported portion, both portions taking up a degree of bulging under normal loading of said tire, wherein said rim has bulged flanks which correspond to said degree of bulging which said side walls of said tire take up under normal loading of said tire, and said flanks extend over a part of the side walls, thereby defining the supported portion of the side walls, a continuous annular supporting surface being provided on said outer face of said rim between said bulged flanks, the rim having a peripheral surface corresponding to the shape of an internal profile of said tire when flat and the rim having on said outer face circumferentially extending recesses, the inner face of the tire being provided with projections adapted to be engaged in said recesses.

2. A wheel as claimed in claim 1, wherein said rim is in the form of an inwardly open profiled section.

3. A vehicle wheel having a hub, an annular rigid rim mounted on said hub, said rim having an inner face in which annular recesses are provided, and a radial outer face, and an inflatable tire of elastic material mounted on said rim and having an inner face, and an outer face, and spaced side walls, the side walls having a supported portion and an unsupported portion, both portions taking up a degree of bulging under normal loading of said tire, wherein said rim has bulged flanks which correspond to said degree of bulging which said side walls of said tire take up under normal loading of said tire, and said flanks extend over a part of the side walls, thereby defining the supported portion of the side walls, a continuous annular supporting surface being provided on said outer face of said rim between said bulged flanks, the rim having a peripheral surface corresponding to the shape of an internal profile of said tire when flat and said rim contains ribs extending between said bulged flanks in a circumferential direction, said ribs substantially at the same height as said flanks.

4. A wheel as claimed in claim 3, wherein said rim is a one-piece ring formed integrally with said bulged flanks and said ribs arranged between them.

5. A wheel as claimed in claim 3, wherein said supporting surface is formed by a flexible ring lying against said outer face of said rim.

6. A wheel as claimed in claim 5, wherein said flexible ring has an inner face, and ribs on said inner face, said ribs projecting into said rim.

7. A wheel as claimed in claim 6, wherein said bulged flanks and said ribs of said rim are of a height which corresponds to substantially one third to two thirds of the height of said side walls of said tire.

8. A wheel as claimed in claim 5, wherein said ring is secured to said bulged flanks and the ribs of the rim.

9. A wheel as claimed in claim 8, wherein said rim forms together with said ring an air-tight container and is provided with pressure-relief valves for the introduction and exhaust of compressed air.

10. A wheel as claimed in claim 9, wherein said valves are of adjustable pressure.

* * * * *